G. A. OLIN.
TREE MEASURING DEVICE.
APPLICATION FILED AUG. 20, 1917.
1,274,315.
Patented July 30, 1918.
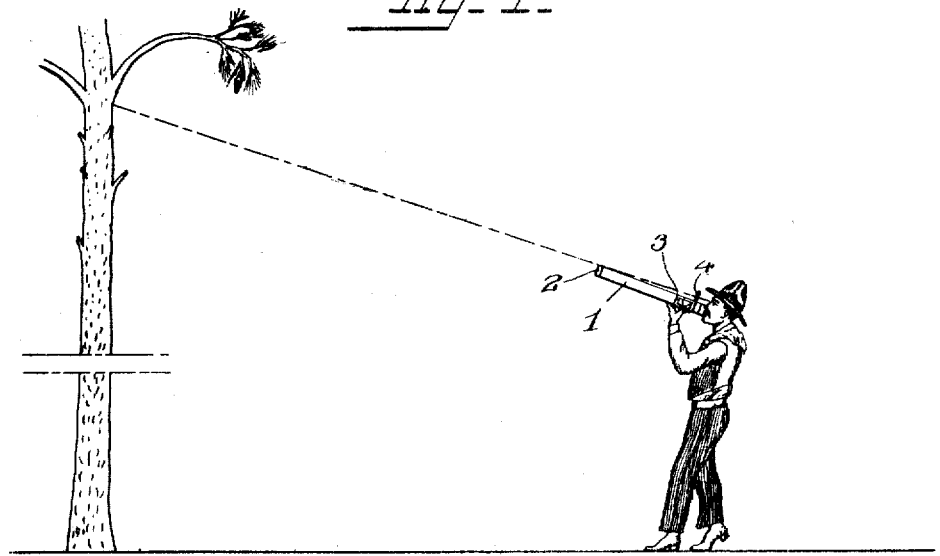
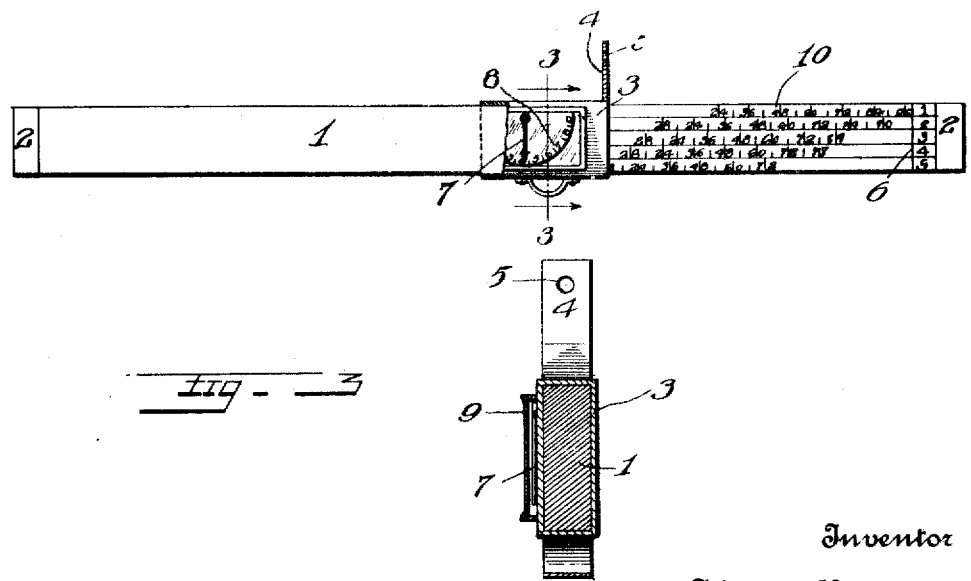
Inventor
Giles A. Olin

UNITED STATES PATENT OFFICE.

GILES A. OLIN, OF SILETZ, OREGON.

TREE-MEASURING DEVICE.

1,274,315.  Specification of Letters Patent.  Patented July 30, 1918.

Application filed August 20, 1917. Serial No. 187,315.

*To all whom it may concern:*

Be it known that I, GILES A. OLIN, a citizen of the United States, residing at Siletz, in the county of Lincoln and State of Oregon, have invented certain new and useful Improvements in Tree-Measuring Devices; and I do declare the following to be a full, clear, and exact description of the invention, such as will enable others skilled in the art to which it appertains to make and use the same.

My invention has for its object to provide a simple and inexpensive, yet a highly efficient and durable instrument for determining the number of logs of a predetermined length, which may be cut from any tree, and for measuring the diameter of such logs.

With the foregoing general object in view, the invention resides in the novel features of construction and unique combinations of parts to be hereinafter fully described and claimed, the descriptive matter being supplemented by the accompanying drawings which form a part of this specification and in which:—

Figure 1 is a side elevation of the improved instrument in use;

Fig. 2 is an enlarged side elevation with the slide partly in vertical section; and Fig. 3 is a vertical transverse section on the plane indicated by the line 3—3 of Fig. 2.

In the drawings above briefly described, the numeral 1 designates a straight bar preferably formed of hard wood and bound at its ends by suitable ferrules 2 which will in most cases be constructed of brass. Mounted upon the bar 1 is a slide 3 which is also by preference formed of brass although any other preferred material could well be employed, said slide having on its upper face a sight plate 4 having a sight opening 5 through which the user sights at the top of the tree when the butt or rear end of the bar 1 is positioned against his cheek as shown in Fig. 1. In using the device the operator must stand a distance of 50 feet from the tree on a horizontal or base line.

By positioning the rear end of the slide 3 upon the transverse line 6, adjacent the rear end of the bar 1, and sighting through the sight opening 5 at the top of the tree, a pointer 7 which is pivotally mounted on one side of said slide, will coact with a scale 8 in showing the number of logs of a predetermined length which may be sawed from the tree. The pointer 7 will in most cases be housed in a suitable glass covered casing 9 and may be removed with the slide when not in use and carried in a leather case or the like so that injury thereof will be prevented.

After determining the number of logs which can be gotten from the tree, the diameter of the logs may be determined by shifting the slide 3 along the bar 1 until the full width of the particular log to be measured is visible through the sight opening 5, this adjustment being made without varying the inclination of the bar. The diameter of the log is shown by a scale 10 formed on one side of the bar 1 the members of said scale representing diameters in inches, and being readable in connection with the rear end of the slide.

From the foregoing, taken in connection with the accompanying drawing, it will be obvious that I have devised an extremely simple and inexpensive, yet a highly efficient and durable instrument of the class described which may well be used by unskilled persons. Since probably the best results are obtained by the specific features of construction shown and described, such features constitute the preferred form of my invention. I wish it understood, however, that within the scope of the claimed invention, numerous minor changes may well be made without sacrificing the principal advantages.

I claim:—

1. In an instrument for determining the number of logs in a tree and measuring the diameter of the same, the combination of a bar, a slide mounted on said bar and having a sight opening through which the user sights at the upper portion of the tree, means on said slide operable by tilting of said bar for showing the number of logs in the tree, and means on said bar for coaction with said slide in showing the diameter of such logs when said slide is shifted along the bar, without varying the inclination of the latter, until the entire width of said log is visible through said sight opening.

2. A tree measuring device comprising a bar, a slide mounted thereon and having a sight opening through which the user sights at an elevated point on the tree, and means on said bar for coacting with said slide in showing the diameter of the tree at the elevation of said point, when said slide is moved along the bar, without moving the latter, until the entire width of the tree is visible through said sight opening.

In testimony whereof I have hereunto set my hand in the presence of two subscribing witnesses.

GILES A. OLIN.

Witnesses:
W. S. HALL,
W. R. HALL.